US011862989B2

(12) United States Patent
Baughman et al.

(10) Patent No.: US 11,862,989 B2
(45) Date of Patent: Jan. 2, 2024

(54) ENVIRONMENT DRIVEN SOLAR POWER MANAGEMENT

(71) Applicant: INTERNATIONAL BUSINESS MACHINES CORPORATION, Armonk, NY (US)

(72) Inventors: Aaron K. Baughman, Cary, NC (US); Shikhar Kwatra, San Jose, CA (US); Diwesh Pandey, Bangalore (IN); Arun Joseph, Bangalore (IN)

(73) Assignee: International Business Machines Corporation Armonk, Armonk, NY (US)

( * ) Notice: Subject to any disclaimer, the term of this patent is extended or adjusted under 35 U.S.C. 154(b) by 517 days.

(21) Appl. No.: 17/213,290

(22) Filed: Mar. 26, 2021

(65) Prior Publication Data

US 2022/0311281 A1    Sep. 29, 2022

(51) Int. Cl.
| H02J 50/30 | (2016.01) |
| H02J 3/00 | (2006.01) |
| H02J 50/90 | (2016.01) |
| G02B 26/08 | (2006.01) |
| B64C 39/02 | (2023.01) |
| B64U 50/34 | (2023.01) |

(52) U.S. Cl.
CPC .......... *H02J 50/30* (2016.02); *G02B 26/0816* (2013.01); *H02J 3/004* (2020.01); *H02J 50/90* (2016.02); *B64C 39/024* (2013.01); *B64U 50/34* (2023.01); *H02J 2300/24* (2020.01)

(58) Field of Classification Search
CPC .. H02J 50/30; H02J 3/004; H02J 50/90; H02J 2300/24; H02J 2300/22; H02J 2310/44; H02J 7/0047; H02J 7/35; H02J 7/00036; G02B 26/0816; B64C 39/024; B64U 50/34; B64U 2101/30
See application file for complete search history.

(56) References Cited

U.S. PATENT DOCUMENTS

| 8,295,989 B2 | 10/2012 | Rettger |
| 8,359,128 B1 | 1/2013 | Segal |
| 10,218,229 B2 | 2/2019 | Alperin |

(Continued)

FOREIGN PATENT DOCUMENTS

| CN | 102536700 A | 7/2012 |
| JP | 2012244837 A | 12/2012 |
| WO | 2019060959 A1 | 4/2019 |

OTHER PUBLICATIONS

Disclosed Anonymously, "Method and System for Recharging Solar Powered Drone by Automatically Optimizing Flight Pattern and Maximizing Sunlight Exposure," IP.com, IP.com No. IPCOM000250679D, IP.com Publication Date: Aug. 20, 2017, 2 pages.

(Continued)

*Primary Examiner* — Wesley J Tucker
(74) *Attorney, Agent, or Firm* — Dmitry Paskalov; Samuel A. Waldbaum (57) ABSTRACT

A computer receives determines a mobile device requires a recharge, where the mobile device have a solar cell and an imaging device. The computer identifies an object with a low diffusion rate. The computer recharges the mobile device, based on determining that the mobile device receiving the solar energy from the identified object.

20 Claims, 6 Drawing Sheets

(56) References Cited

U.S. PATENT DOCUMENTS

| | | |
|---|---|---|
| 10,291,056 B2 | 5/2019 | Bell |
| 10,476,296 B1* | 11/2019 | Rausch .................. B64C 39/024 |
| 10,978,989 B1* | 4/2021 | Jakobsen ................ B60L 50/60 |
| 11,755,034 B1* | 9/2023 | Dhoot .................. G05D 1/0278 |
| | | 701/23 |
| 2009/0292407 A1* | 11/2009 | Minelli ................... B64C 27/26 |
| | | 429/456 |
| 2013/0314699 A1* | 11/2013 | Jungerman ........... G01J 1/0266 |
| | | 356/139.01 |
| 2016/0311545 A1* | 10/2016 | Parks .................... B64C 23/072 |
| 2018/0075760 A1 | 3/2018 | Thompson |
| 2018/0281945 A1* | 10/2018 | Needham ............... H02N 2/186 |
| 2019/0009916 A1* | 1/2019 | Von Novak ............ B64D 27/24 |
| 2019/0084427 A1* | 3/2019 | Dudar ................. H01M 10/465 |
| 2019/0146512 A1* | 5/2019 | Sindlinger ........... G05D 1/0278 |
| | | 701/26 |
| 2019/0248243 A1* | 8/2019 | Gaither ................... B60L 8/003 |
| 2021/0291686 A1* | 9/2021 | Abe ........................ B60L 53/60 |
| 2022/0261012 A1* | 8/2022 | Ladurini .............. G08G 5/0039 |

OTHER PUBLICATIONS

Mell et al., "The NIST Definition of Cloud Computing", National Institute of Standards and Technology, Special Publication 800-145, Sep. 2011, 7 pages.

Baughman et al., "Environment Driven Solar Power Management," Application and Drawings, Filed on Mar. 24, 2022, 32 Pages, International Patent Application No. PCT/CN2022/082781.

International Search Report and Written Opinion of International Application No. PCT/CN2022/082781, dated Jun. 1, 2022, 9 pages.

\* cited by examiner

ENVIRONMENT DRIVEN SOLAR POWER MANAGEMENT

BACKGROUND

The present invention relates, generally, to the field of computing, and more particularly to a computerized method for solar power utilization and management.

Shifting from fossil fuels to electrical power systems are accelerating worldwide. Many mobile devices such as vehicles, ships and drones utilize electrical operation based on solar battery sources. Power optimization is essential for long running battery-operated devices. In many cases, mobile devices lack frequent access points for charging. The lack of charging locations is even more pronounced for flying mobile devices such as drones.

Drones are unmanned aerial vehicles that typically use electric power to operate and integrate mobile connectivity, geolocation, and visualization capabilities. In recent years, drones have become widely used for surveillance, weather forecasting, and package delivery applications.

A geolocation device is an electronic component for identification or estimation of a real-world geographic location of an object, such as a radar source, mobile phone, or Internet-connected computer terminal. In its simplest form, geolocation involves the generation of a set of geographic coordinates and is closely related to the use of positioning systems, such as Global Positioning System (GPS).

SUMMARY

According to one embodiment, a method, computer system, and computer program product for solar power management is provided. The present embodiment may include a computer determines a mobile device requires a recharge, where the mobile device have a solar cell and an imaging device. The computer may identify an object with a low diffusion rate and recharge the mobile device based on that the mobile device receiving the solar energy from the identified object.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a computerized method for solar power utilization and management. The following described exemplary embodiments provide a system, method, and program product to, among other things, enable solar power recharging of a mobile device when a direct source of the solar power is obstructed due to weather or other physical conditions. Therefore, the present embodiment has the capacity to improve the technical field of managing power of mobile devices by enabling solar charging when a direct solar source is obstructed.

As previously described, shifting from fossil fuels to electrical power systems are accelerating worldwide. Many mobile devices such as vehicles, ships and drones utilize electrical operation based on solar battery sources. Power optimization is essential for long running battery-operated devices. In many cases, mobile devices lack frequent access points for charging. The lack of charging locations is even more pronounced for flying mobile devices such as drones.

Due to changing weather, or other physical obstacles, battery recharging or operation under solar energy may be impinged when there are obstructions affecting a solar charging or operation-equipped device. For example, due to cloud formations, a drone may have little or no direct sunlight available for a solar cell and, thus, unable to adequately replenish expended battery energy. In addition, when the drone is above a body of water, the drone cannot perform an emergency landing in the event of full battery depletion. As such, it may be advantageous to, among other things, implement a system capable of recharging depleted battery energy by focusing equipped solar cells toward objects with low diffusion, such a body of water, in order to more effectively optimize available solar energy for battery recharging. In at least one other embodiment, the system may utilize an ad hoc network of one or more unmanned vehicles within a preconfigured radius to reflect available solar rays toward the device, thus enable recharging or continuous operation of the mobile device, such as unmanned aerial vehicle (UAV), when direct solar energy is unavailable.

Typically, reflection ratio of solar radiation from a surface is a function of surface smoothness and angle of sunlight. Specular reflection occurs when solar light falls on the surface and reflects off in a single outgoing direction. A mirror presents an example of reflecting light in a single direction. On the other hand, when light rays are reflected in multiple directions, then diffuse, reflection occurs resulting in the reflected solar radiation being unusable.

The smoothness of a body that reflects solar radiation, such as a water surface, may be affected by environmental factors, such as wind speed and wind direction. For example, high wind speed may cause more disturbances on water and, therefore, may reduce the smoothness of the surface. This results in higher diffusion rate of a solar radiation.

According to one embodiment, a device may determine that power level of a battery may be below a threshold level and requires immediate, and possibly emergency, recharging through equipped solar panels. Captured weather, geolocation, and environmental data may be analyzed and, after identifying one or more nearby objects with low diffusion, utilizing the light emission from the one or more objects that may be reflected, either directly or indirectly, using other mobile devices in order to maximize the recharging energy of the mobile device requiring a recharge.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to enable recharging of a mobile device using solar energy when a direct source (i.e., the sun) is obstructed.

Figure 1:
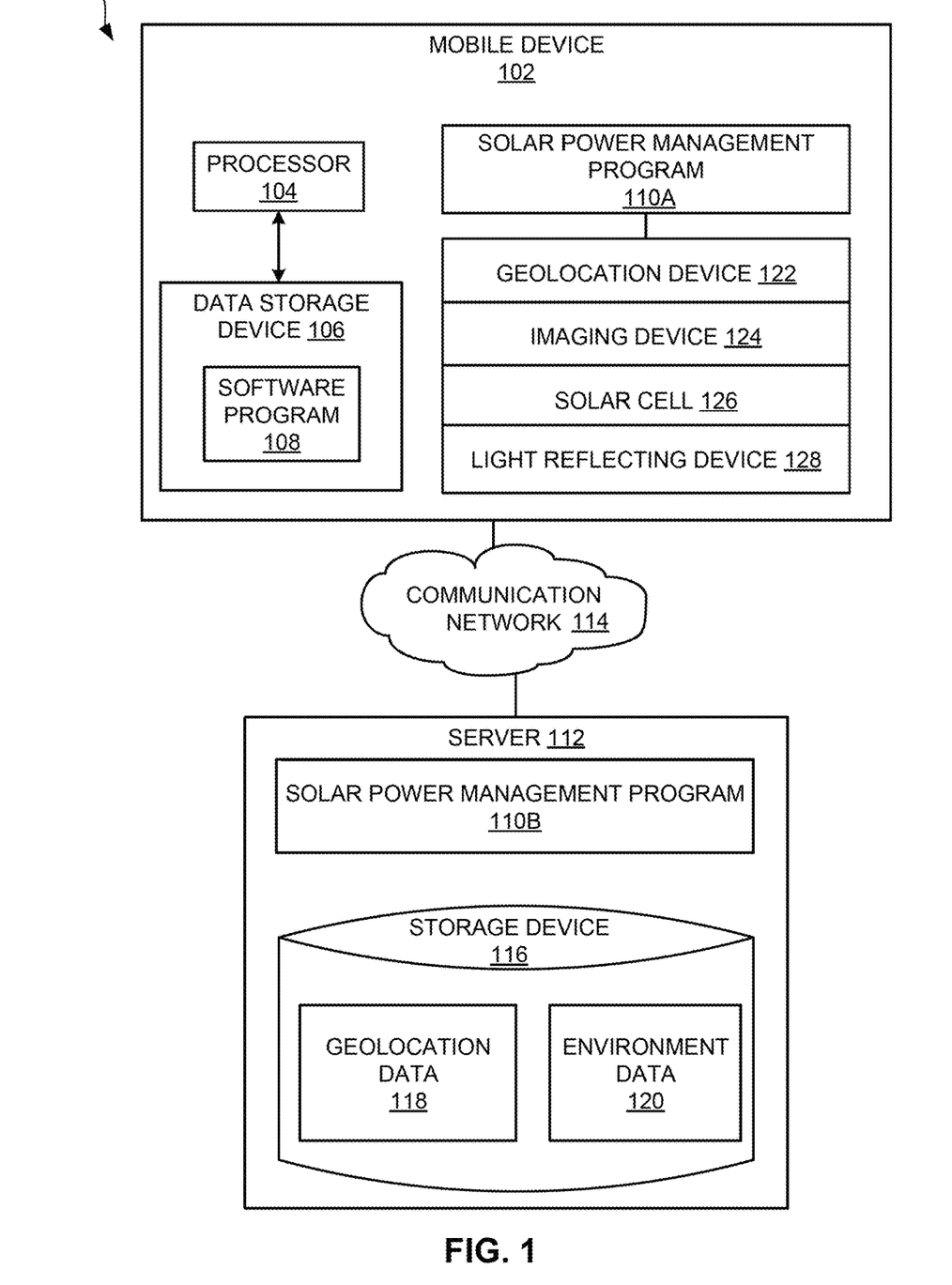
FIG. 1 illustrates an exemplary networked computer environment according to at least one embodiment.

Referring to FIG. 1, an exemplary networked computer environment 100 is depicted, according to at least one embodiment. The networked computer environment 100 may include mobile device 102 and a server 112 interconnected via a communication network 114. According to at least one implementation, the networked computer environment 100 may include a plurality of mobile devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Mobile device 102 may include a processor 104 and a data storage device 106 that are connected or attached to a geolocation device 122, imaging device 124, solar cell 126 and light reflecting device 128 and is enabled to host and run a software program 108 and a solar power management (SPM) program 110A and communicate with the server 112 via the communication network 114, in accordance with one embodiment of the invention. Mobile device 102 may be, for example, a mobile device, a mobile telephone, a personal digital assistant, a netbook, a laptop computer, a tablet computer, a drone, an electrical moving device, or any type of computing device capable of hosting and controlling one or more of the geolocation device 122, imaging device 124, solar cell 126 and light reflecting device 128 while running a program and accessing a network. As will be discussed with reference to FIG. 4, the mobile device 102 may include internal components 402a and external components 404a, respectively. For example, mobile device 102 may be a mobile phone that has a solar cell 122 that may receive a light reflected from a light reflecting device of a drone in order to charge the battery.

According to an example embodiment, the geolocation device 122 may be a Global Positioning System (GPS) device that is based on a global navigation satellite system, or any other device that may receive a radio signal and determine a location of the mobile device using triangulation. The imaging device 124, may be a camera or other image capturing device that may capture a photograph of a surrounding space in order to analyze the surface for determination of light sources or light reflecting objects. The solar cell 126 may be any type of device that is capable of transforming solar radiation, such as light, into an electrical current for charging an onboard battery installed on mobile device 102 or operating the mobile device 102. According to an example embodiment, the solar cell 126 may incorporate one or more servo engines or other devices capable of angling, rotating and/or otherwise positioning a solar cell 126 placed on any directional surface of the mobile device 102 in order to maximize the transformation of the solar energy into the electrical current. The light reflecting device 128 may be a movable light reflector, such as a mirror or any other device capable of reflecting and focusing the solar energy into a specific direction. The light reflecting device 128, may be a standalone device, a part of the solar cell 126 or integrated into the solar cell 126. For example, the solar cell 126 may have a partially reflecting surface thus allowing it to convert part of the light into electricity and reflecting the rest to the requested direction.

The server 112 may be a laptop computer, netbook computer, personal computer (PC), a desktop computer, or any programmable electronic device or any network of programmable electronic devices capable of hosting and running a solar power management (SPM) program 110B and a storage device 116 with geolocation data 118 and environmental data 120. The server 112 is communicating with the mobile device 102 via the communication network 114, in accordance with embodiments of the invention. As will be discussed with reference to FIG. 4, the server 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The geolocation data 118 may store all of the current locations of the one or more mobile devices, such as mobile device 102, that are received from geolocation device 122 via communication network 114. The one or more mobile devices utilized to provide recharging assistance through the SPM program 110A, 110B may be owned and operated as part of a vehicle fleet with a common owner or have opted in to the SPM program 110A, 110B through a user opt-in procedure. The environmental data 120 may include weather conditions in the space area of the mobile device 102, such as clouds, wind speed, and wind direction, water bodies and other light-emitting and reflecting objects, such as glass buildings or reflecting roofs. According to an example embodiment, the environmental data 120 may be limited in the area while the space area may be determined as a sphere or a hemisphere having a radius not more than a visibility range at the location of the mobile device 102.

According to the present embodiment, the SPM program 110A, 110B may be a program capable of identifying an object with low diffusion that may be used directly or through other mobile devices in order to transmit the solar energy from the object to a solar panel of the mobile device in order to recharge or operate the mobile device. The solar power management method is explained in further detail below with respect to FIG. 2.

Figure 2:
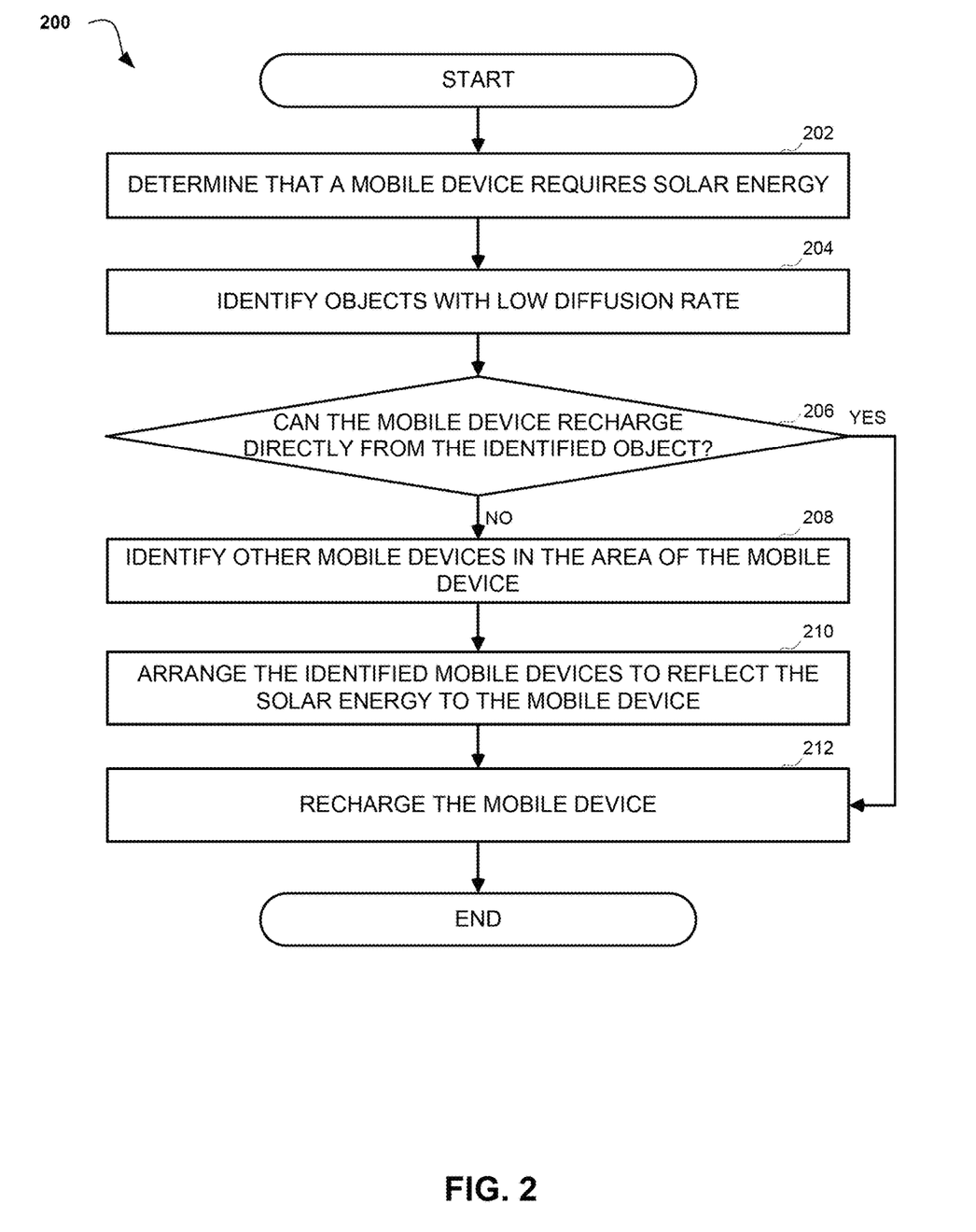
FIG. 2 is an operational flowchart illustrating a solar power management process according to at least one embodiment.

Referring now to FIG. 2, an operational flowchart illustrating a solar power management process 200 is depicted according to at least one embodiment. At 202, the SPM program 110A, 110B determines a mobile device requires a solar energy. According to an example embodiment, the SPM program 110A, 110B may monitor battery levels of all the mobile devices connected to the service and, when one of the mobile devices, such as mobile device 102, transmits a signal over the network that the battery level is low, determine that the mobile device requires a recharging. In another embodiment, SPM program 110A, 110B may determine that the mobile device requires recharging when the mobile device 102 is unable to use direct solar power after directing solar cell 126 to a source, such as the sun. For example, the SPM program 110A, 110B may use imaging device 124 to capture images and determine that the mobile device 102 requires a recharging when the power is below a predetermined threshold and no solar power source is identified when analyzing the images from imaging device 124.

Next, at 204, the SPM program 110A, 110B identifies objects with low diffusion rate. As previously mentioned, diffusion rate may be related to a smoothness of a body or a surface of an area that reflects solar energy, such as a water surface. The diffusion rate of the water surface may be affected by environmental factors, such as wind speed and wind direction. The wind may generate waves on the surface of the water that increase dissipation of the solar light thus having a higher diffusion rate that may not be useful for recharging a mobile device. According to an example embodiment, SPM program 110A, 110B may receive images from the imaging device 124 and, using a visual recognition method, identify one or more objects that reflect light from a source or have a low diffusion rate. In another embodiment, SPM program 110A, 110B may access and search the environmental data 120 for objects in the space area. In a further embodiment, SPM program 110A, 110B may use a trained deep neural network to analyze the received images and the environmental data 120 to identify objects with a low diffusion rate. For example, if the surface area incorporates several water surfaces and buildings having glass panes, the SPM program 110A, 110B may direct the solar cell 126 to a light reflection from each of the identified objects to determine a highest electricity generating source.

Then, at 206, the SPM program 110A, 110B determines whether the mobile device can recharge directly from the identified objects. According to an example embodiment, when a mobile device 102 is below the clouds and cannot identify any solar energy reflecting or generating source or a solar energy the mobile device receives using a solar cell 126 that is directed to the source is below a minimum threshold required for recharging, the SPM program 110A, 110B determines it cannot recharge directly from the identified objects. For example, if SPM program 110A, 110B identifies a reflection of the light from the received image after visual recognition processing then the mobile device may charge directly from one or more identified objects. If the SPM program 110A, 110B can directly recharge from the identified object (step 206, "YES" branch), the SPM program 110A, 110B may continue to step 212 to recharge the mobile device 102. If the SPM program 110A, 110B determines the mobile device 102 cannot charge directly from the identified objects (step 212, "NO" branch), the SPM program 110A, 110B may continue to step 208 to identify other mobile devices in the surface area of the mobile device.

Next, at 208, in response to determining the mobile device 102 cannot recharge directly from the identified object, the SPM program 110A, 110B identifies other mobile devices within a threshold distance of the mobile device. According to an example embodiment, SPM program 110A, 110B may set a preconfigured spherical distance around the mobile device having a radius equal to the visibility distance acquired from environmental data 120. In another embodiment, the SPM program 110A, 110B may determine a distance based on the imaging device 124 resolution and/or solar cell 126 aiming capabilities. For example, if a resolution of the imaging device 124 does not allow to identify objects further than several miles, the radius will not exceed the maximum resolution limitation. Similarly if a solar sell 126 has limitations on its movement and aiming, such as servo engines having angling incrementations of two degrees, it may affect aiming of the solar panel to a specific source. In another embodiment, the area may be of any shape or form predetermined by a user, such as cubical or hemispherical. Then, the SPM program 110A, 110B may identify and control all the mobile devices that were identified in the area and flag them as other mobile devices in the area in the geolocation data 118 in order to assist with recharging of the mobile device 102.

Figure 3:
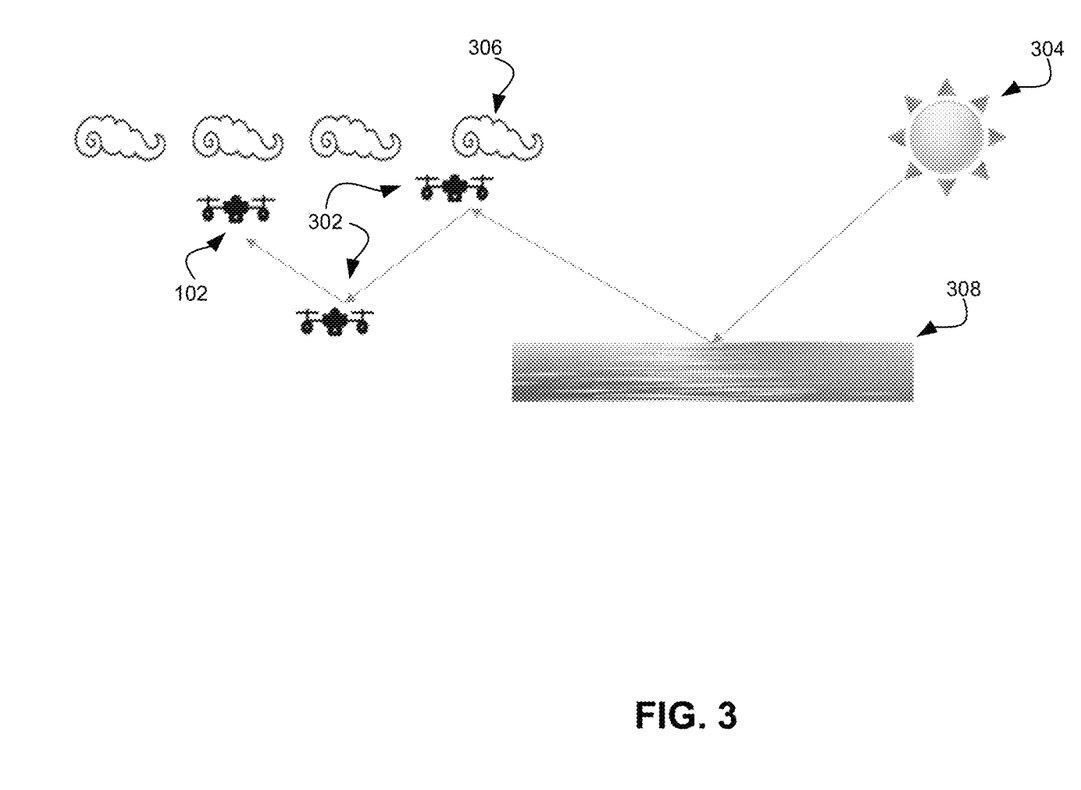
FIG. 3 is a diagram depicting an operation of the solar power management process according to at least one embodiment.

Then, at 210, the SPM program 110A, 110B arranges the identified mobile device to reflect the solar energy to the mobile device. According to an example embodiment, the SPM program 110A, 110B may team together all the identified mobile devices in the area of the mobile device by causing the identified mobile devices to relocate to a position that resembles a chain in order to reflect the solar energy from the object with low diffusion rate, through an associated light reflecting device 128 associated with each identified mobile device, to the mobile device that requires a recharging, as depicted in FIG. 3. For example, the SPM program 110A, 110B may arrange the plurality of other mobile devices in the space to reflect the solar radiation by positioning the plurality of other mobile devices in a chain structure that reflects the solar radiation from the identified object using the light reflecting device of a first mobile device towards the light reflecting device of a second mobile device which in turn reflects the solar radiation to the solar cell of the mobile device. The optimal distance between the mobile devices and their relative location may be determined using a trained neural network that receives, as inputs, a voltage generated by the solar cells and location of each of the identified mobile devices. For example, if mobile devices are drones and one of the drones is under clouds and cannot directly charge from the sunlight, other drones that are in the area may arrange in a chain and, by reflecting and refocusing light from a water source, provide the requested solar power to the drone that requested recharging. In further embodiments, the distance between the identified mobile devices in the chain may be determined based on most efficient solar energy transfer when the maximum distance between each of two mobile devices may be determined based on a surface area of the solar cell 126 and an area of the reflected light that may be determined using imaging device 124, such as that all the reflected light will be within the most efficient range of the solar cell. In another embodiment, the SPM program 110A, 110B may control the identified mobile devices reflect the solar energy to the mobile device that requires recharging using a solar energy generator that is incorporated in that device.

Next, at 212, the SPM program 110A, 110B recharges the mobile device. According to an example embodiment, the SPM program 110A, 110B may instruct the mobile device that requires a recharge to align the solar cell 126 to the solar energy source such as either to the closest identified mobile device or to the closest object having a low emission rate. According to an example embodiment, the SPM program 110A, 110B may maintain the recharging of the mobile device until a battery of the mobile device reaches a threshold. The threshold for recharging may be determined by a user or based on determination what is a minimum battery charge for the mobile device 102 to reach a recharging location. In further embodiment, the SPM program 110A, 110B may charge the mobile device 102 until the batteries are fully charged.

FIG. 3 depicting an operation of the solar power management process according to at least one embodiment. The mobile device 102, according to an example embodiment, is in need of a battery charge through solar cell 126 but sufficient solar radiation is obstructed by clouds 306 and a direct charge using solar radiation 304 is unavailable. In this scenario, SPM program 110A, 110B may utilizing objects with low diffusion coefficient, such as a body of water 308, and other unmanned aerial vehicles 302 in order to deliver solar radiation for recharging of mobile device 102.

It may be appreciated that FIGS. 2 and 3 provide only an illustration of one implementation and do not imply any limitations with regard to how different embodiments may be implemented. Many modifications to the depicted environments may be made based on design and implementation requirements. According to one embodiment, in response to the SPM program 110A, 110B determining that the mobile device 102 can recharge directly without needing other mobile devices and multiple identified objects are present, the SPM program 110A, 110B may calculate a position at which an optimal amount of reflected light is received by the solar cell 126. For example, if the SPM program 110A, 110B identifies three objects, such as nearby bodies of water, with satisfactory diffusion rates, the SPM program 110A, 110B may position the solar cell at an angle and direction toward all three bodies of water so that the light received is most optimal for recharging even though optimal light from any single body of water may not be received at that position. In another embodiment, if one of the identified mobile devices have a light source, the SPM program 110A, 110B may cause the light source of the identified mobile device to emit the light on a solar cell 126 of the mobile device 102 to recharge it when no other solar radiation is available.

FIG. 3 depicting an operation of the solar power management process according to at least one embodiment. The mobile device 102, according to an example embodiment, is in need of a battery charge through solar cell 126 but sufficient solar radiation is obstructed by clouds 306 and a direct charge using solar energy 304 is unavailable. In this scenario, SPM program 110A, 110B may utilizing objects with low diffusion coefficient, such as a body of water 308, and other unmanned aerial vehicles 302 in order to deliver solar energy for recharging of mobile device 102.

Figure 4:
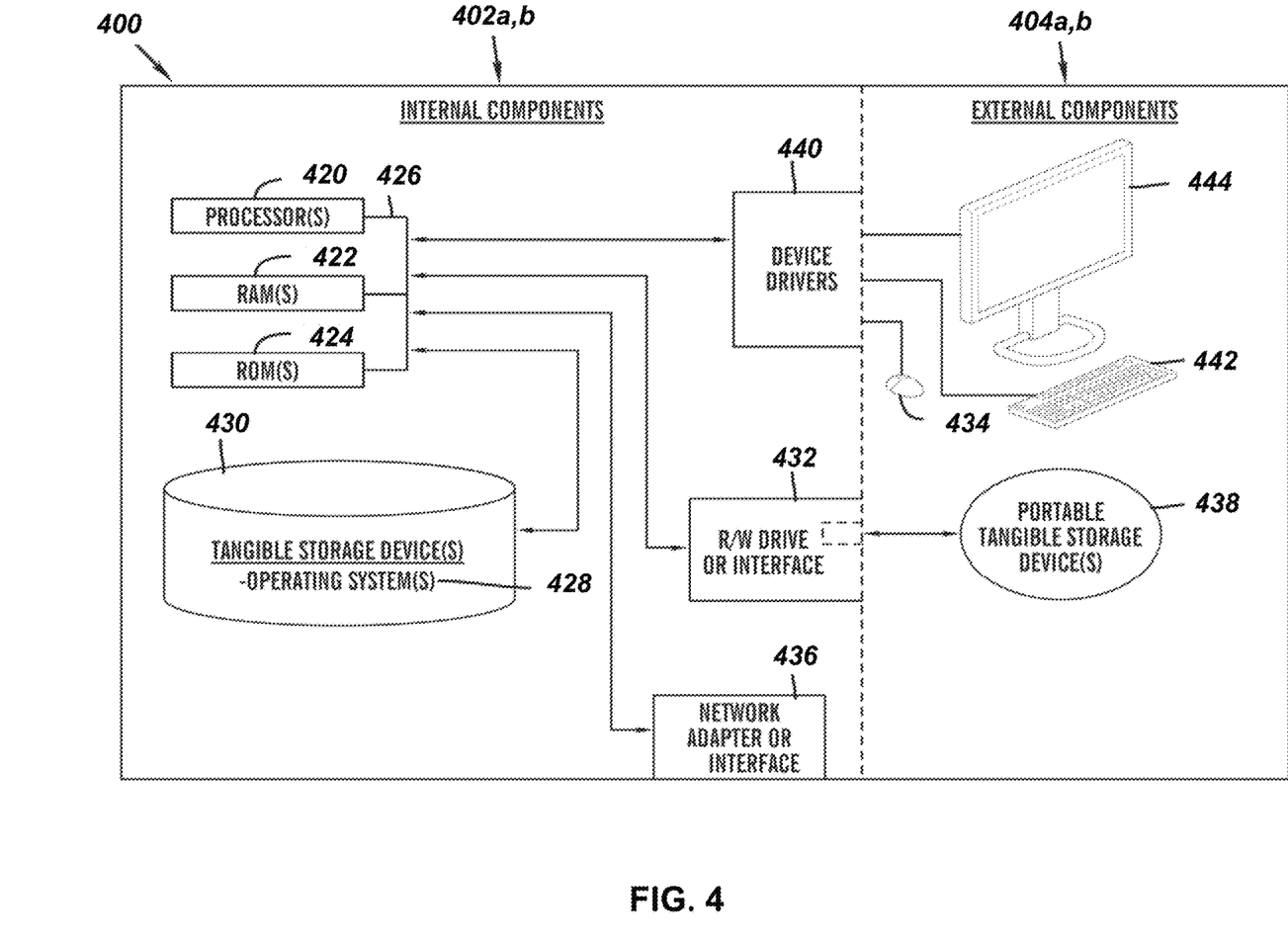
FIG. 4 is a block diagram of internal and external components of computers and servers depicted in FIG. 1 according to at least one embodiment.

FIG. 4 is a block diagram 400 of internal and external components of the mobile device 102 and the server 112 depicted in FIG. 1 in accordance with an embodiment of the present invention. It should be appreciated that FIG. 4 provide only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server systems, thin clients, thick clients, hand-held or laptop devices, multiprocessor systems, microprocessor-based systems, network PCs, minicomputer systems, and distributed cloud computing environments that include any of the above systems or devices.

The mobile device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the SPM program 110A in the mobile device 102, and the SPM program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the SPM 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the SPM program 110A in the mobile device 102 and the SPM program 110B in the server 112 can be downloaded to the mobile device 102 and the server 112 from an external computer via a network (for example, the Internet, a local area network or other, wide area network) and respective network adapters or interfaces 436. From the network adapters or interfaces 436, the software program 108 and the SPM program 110A in the mobile device 102 and the SPM program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
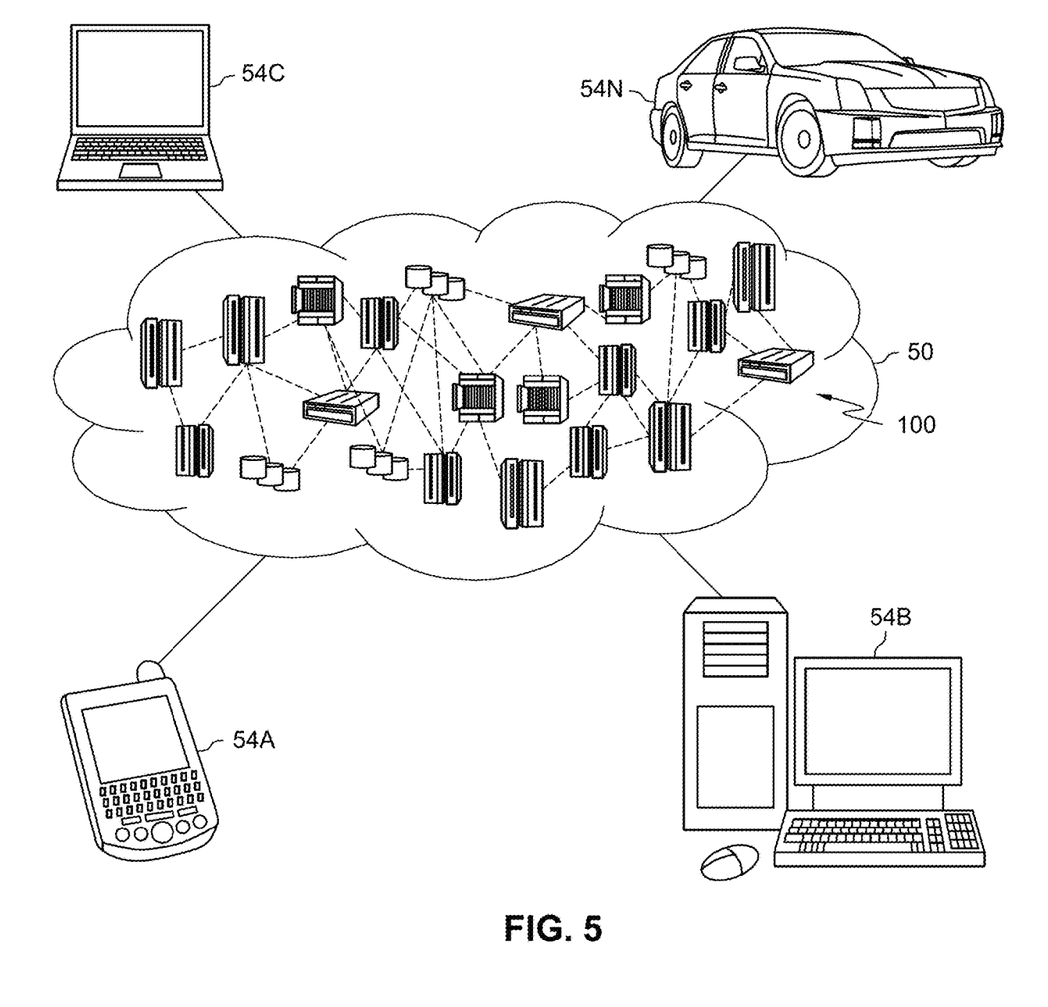
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
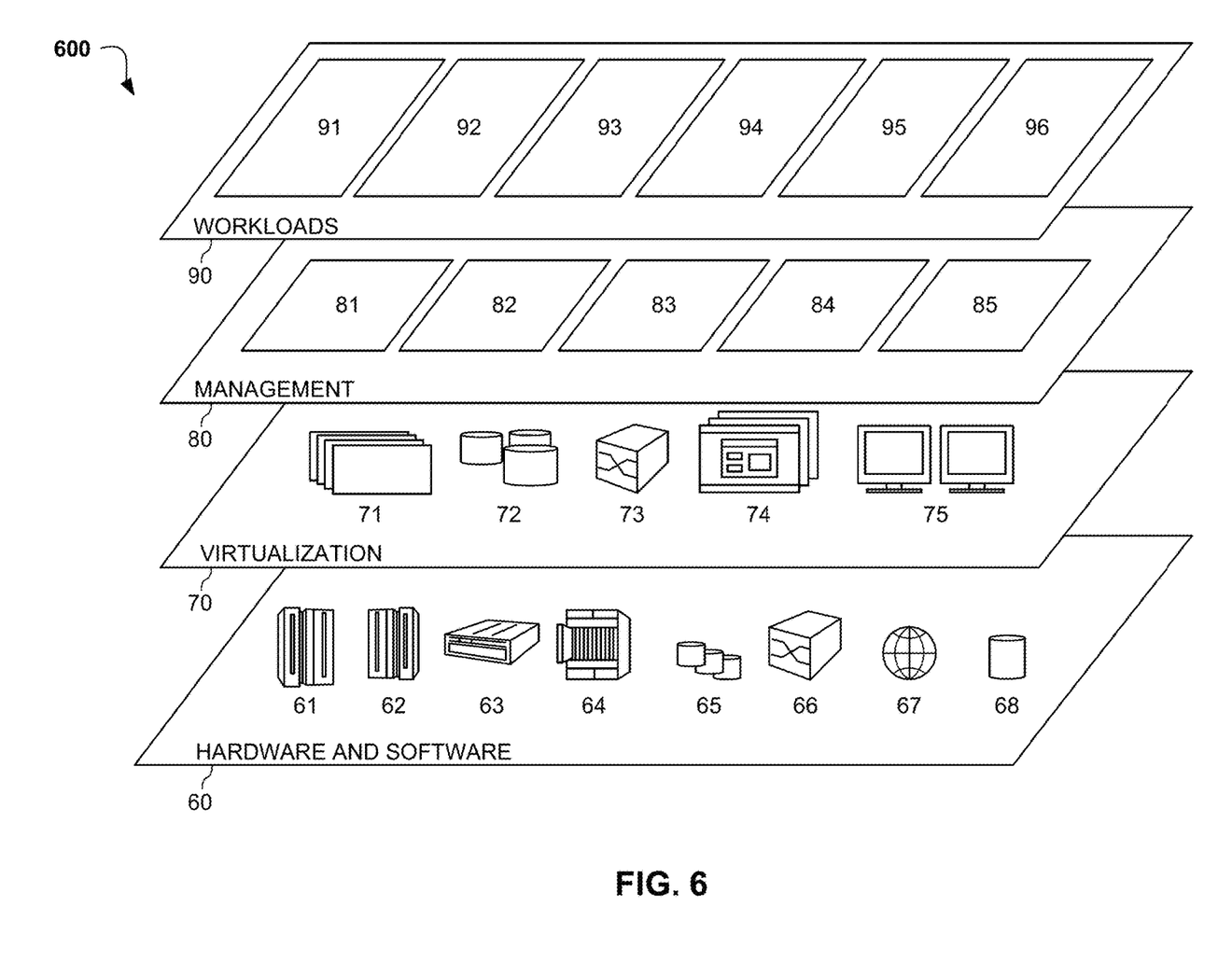
FIG. 6 depicts abstraction model layers according to an embodiment of the present invention.

Referring now to FIG. 6, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and solar power management 96. Solar power management 96 may relate to enabling recharging of a mobile device by transmitting solar energy using other mobile devices from an object that reflects the solar energy in the instances when the mobile device is unable to charge directly from the source of the solar energy due to obstacles.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for solar power management, the method comprising:
   determining a mobile device requires a recharge, wherein the mobile device has attached a solar cell and an imaging device;
   identifying, by the imaging device, an object with a low diffusion rate within a preconfigured distance of the mobile device;
   identifying a plurality of other mobile devices having a light reflecting device in a space where the object with the low diffusion rate is located;
   arranging the plurality of other mobile devices in the space to reflect solar radiation, using the light reflecting device, from the identified object to the mobile device;
   causing the mobile device to receive the solar radiation, by orienting the solar cell toward at least one of the plurality of other mobile devices.

2. The processor-implemented method of claim 1, wherein the low diffusion rate is identified using a trained neural network that analyzes images from the imaging device and weather conditions in the space.

3. The processor-implemented method of claim 1, wherein the low diffusion rate is identified using a trained neural network that analyzes weather conditions in the space.

4. The processor-implemented method of claim 1, wherein the object is identified by analyzing surfaces of the space using the imaging device and a visual recognition method, wherein the visual recognition method identifies, as the object, at least one of the surfaces that has a reflection of a light source.

5. The processor-implemented method of claim 1, wherein arranging the plurality of other mobile devices in the space further comprises relocating each of two mobile devices from the plurality of other mobile devices in the space to a distance determined based on a surface area of the solar cell and an area of a reflected light on the solar cell.

6. The processor-implemented method of claim 1, wherein arranging the plurality of other mobile devices in the space to reflect the solar radiation is by positioning the plurality of other mobile devices in a chain structure that reflects the solar radiation from the identified object using the light reflecting device of a first mobile device towards the light reflecting device of a second mobile device which in turn reflects the solar radiation to the solar cell of the mobile device.

7. The processor-implemented method of claim 5, further comprising:
   recharging the mobile device using the solar cell by receiving the reflected solar radiation from a light source of at least one of the plurality of other mobile devices equipped with the light source.

8. A computer system for solar power management, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   determining a mobile device requires a recharge, wherein the mobile device has attached a solar cell and an imaging device;
   identifying, by the imaging device, an object with a low diffusion rate within a preconfigured distance of the mobile device;
   identifying a plurality of other mobile devices having a light reflecting device in a space where the object with the low diffusion rate is located;
   arranging the plurality of other mobile devices in the space to reflect solar radiation, using the light reflecting device, from the identified object to the mobile device;
   causing the mobile device to receive the solar radiation, by orienting the solar cell toward at least one of the plurality of other mobile devices.

9. The computer system of claim 8, wherein the low diffusion rate is identified using a trained neural network that analyzes images from the imaging device and weather conditions in the space.

10. The computer system of claim 8, wherein the low diffusion rate is identified using a trained neural network that analyzes weather conditions in the space.

11. The computer system of claim 8, wherein the object is identified by analyzing surfaces of the space using the imaging device and a visual recognition method, wherein the visual recognition method identifies, as the object, at least one of the surfaces that has a reflection of a light source.

12. The computer system of claim 8, wherein arranging the plurality of other mobile devices in the space further comprises relocating each of two mobile devices from the plurality of other mobile devices in the space to a distance determined based on a surface area of the solar cell and an area of a reflected light on the solar cell.

13. The computer system of claim 8, wherein arranging the plurality of other mobile devices in the space to reflect the solar radiation is by positioning the plurality of other mobile devices in a chain structure that reflects the solar radiation from the identified object using the light reflecting device of a first mobile device towards the light reflecting device of a second mobile device which in turn reflects the solar radiation to the solar cell of the mobile device.

14. The computer system of claim 8, further comprising:
recharging the mobile device using the solar cell by receiving the reflected solar radiation from a light source of at least one of the plurality of other mobile devices equipped with the light source.

15. A non-transitory computer-readable storage medium storing a computer program product, the computer program product comprising:
program instructions executable by a processor, the program instructions comprising:
program instructions to determine a mobile device requires a recharge, wherein the mobile device has attached a solar cell and an imaging device;
program instructions to identify, by the imaging device, an object with a low diffusion rate within a preconfigured distance of the mobile device;
program instructions to identify a plurality of other mobile devices having a light reflecting device in a space where the object with the low diffusion rate is located;
program instructions to arrange the plurality of other mobile devices in the space to reflect solar radiation, using the light reflecting device, from the identified object to the mobile device;
program instructions to cause the mobile device to receive the solar radiation, by orienting the solar cell toward at least one of the plurality of other mobile devices.

16. The computer program product of claim 15, wherein the low diffusion rate is identified using a trained neural network that analyzes images from the imaging device and weather conditions in the space.

17. The computer program product of claim 15, wherein the low diffusion rate is identified using a trained neural network that analyzes weather conditions in the space.

18. The computer program product of claim 15, wherein the object is identified by program instructions to analyze surfaces of the space using the imaging device and a visual recognition method, wherein the visual recognition method identifies, as the object, at least one of the surfaces that has a reflection of a light source.

19. The computer program product of claim 15, wherein program instructions to arrange the plurality of other mobile devices in the space further comprises program instructions to relocate each of two mobile devices from the plurality of other mobile devices in the space to a distance determined based on a surface area of the solar cell and an area of a reflected light on the solar cell.

20. The computer program product of claim 15, wherein program instructions to arrange the plurality of other mobile devices in the space to reflect the solar radiation is by program instructions to locate the plurality of other mobile devices in a chain structure that reflects the solar radiation from the identified object using the light reflecting device of a first mobile device towards the light reflecting device of a second mobile device that reflects the solar radiation to the solar cell of the mobile device.

* * * * *